US010647426B2

(12) United States Patent
Fen (10) Patent No.: US 10,647,426 B2
(45) Date of Patent: May 12, 2020

(54) HIGH-FLYING SOLAR UNMANNED AIRCRAFT SYSTEM CAPABLE OF EXTENDING ENDURANCE TIME

(71) Applicant: GLOBALINK INTELLIGENCE LIMITED, Zhubei, Hsinchu County (TW)

(72) Inventor: Chiu-Shia Fen, Hsinchu County (TW)

(73) Assignee: GLOBALINK INTELLIGENCE LIMITED, Zhubei (TW)

( * ) Notice: Subject to any disclaimer, the term of this patent is extended or adjusted under 35 U.S.C. 154(b) by 435 days.

(21) Appl. No.: 15/722,474

(22) Filed: Oct. 2, 2017

(65) Prior Publication Data

US 2019/0100312 A1    Apr. 4, 2019

(51) Int. Cl.
*B64D 1/02* (2006.01)
*B64D 41/00* (2006.01)

(52) U.S. Cl.
CPC .......... *B64D 1/02* (2013.01); *B64C 2201/042* (2013.01); *B64C 2201/06* (2013.01); *B64C 2201/082* (2013.01); *B64D 2041/002* (2013.01); *B64D 2211/00* (2013.01)

(58) Field of Classification Search
CPC ............... B64D 1/02; B64D 2041/002; B64D 2211/00; B64D 5/00; B64C 2201/042; B64C 2201/082; B64C 2201/06; B64C 39/024; B64C 2201/165; B64C 2201/104; B64C 2201/021; B64C 37/02
See application file for complete search history.

(56) References Cited

U.S. PATENT DOCUMENTS

| 1,650,346 | A | * | 11/1927 | Hall | B64D 5/00 |
| | | | | | 244/2 |
| 1,925,768 | A | * | 9/1933 | Mayo | B64D 5/00 |
| | | | | | 244/2 |
| 3,367,233 | A | * | 2/1968 | Silverschotz | F42B 3/006 |
| | | | | | 89/1.51 |
| 6,056,237 | A | * | 5/2000 | Woodland | B64C 3/40 |
| | | | | | 244/3.15 |
| 2016/0297520 | A1 | * | 10/2016 | Sada-Salinas | B64C 29/0025 |

\* cited by examiner

*Primary Examiner* — Valentina Xavier
(74) *Attorney, Agent, or Firm* — Birch, Stewart, Kolasch & Birch, LLP (57) ABSTRACT

A high-flying solar unmanned aircraft system capable of extending endurance time is disclosed. The system includes a main aircraft, a separable auxiliary power source and a connection device. The main aircraft includes a first body, a second body, a first wing portion, a second wing portion, a third wing portion, a first propeller and a second propeller. The second wing portion locates between the first body and the second body, and the second wing portion connects the first body and the second body. The connection device connects the main aircraft and the auxiliary power source, and includes a separation device. When the system climbs, the separable auxiliary power source provides additional energy to assist the main aircraft to climb. When reaching a preset altitude, the separation device, by burning out a line of connection bent, is turned on such that the auxiliary power source is separated from the main aircraft.

13 Claims, 10 Drawing Sheets

HIGH-FLYING SOLAR UNMANNED AIRCRAFT SYSTEM CAPABLE OF EXTENDING ENDURANCE TIME

BACKGROUND OF THE INVENTION

1. Field of the Invention

The present invention relates to an aircraft system, and more particularly to a high-flying solar unmanned aircraft system capable of extending endurance time.

2. Description of Related Art

A conventional high-flying solar unmanned aircraft means an aircraft that is unmanned and using solar power as a power source. The aircraft can convert the solar power to electric power and flies at a altitude of 15 km to 20 km. The surface of the high-flying solar unmanned aircraft is disposed with solar battery. In the daytime, a portion of the electric power generated by the solar battery is used as a power for cruise. Another portion of the electric power generated by the solar battery is stored in the battery of the aircraft to provide a power source for night flight. Because the operation energy of the high-flying solar unmanned aircraft is self-sufficient so that each flight mission can continue for several days to several months.

Currently, the design of the high-flying solar unmanned aircraft encounters some technology problems. Wherein, when the high-flying solar unmanned aircraft is climbing, a large trust is required so that a lot of electric energy is consumed. The consumption of the electric energy requires many batteries to provide energy so that a weight of the high-flying solar unmanned aircraft is increased. However, when the high-flying solar unmanned aircraft reach a cruise altitude, the aircraft does not require so many batteries, and the batteries become a burden of the high-flying solar unmanned aircraft such that an endurance time is shorten, and the aircraft have to return early.

Accordingly, how to improve the conventional art to provide a large trust when the high-flying solar unmanned aircraft takes off and climbs, and provide a light-weight design aircraft at the same time is a research project required to be improved and full of challenge.

SUMMARY OF THE INVENTION

The purpose of the present invention is to provide a high-flying solar unmanned aircraft system that can simultaneously provide a large trust when the aircraft system takes off and climbs and a light-weight design when the aircraft system reaches a cruise altitude.

In order to solve the above technology problem, a technology solution adopted by the present invention is: a high-flying solar unmanned aircraft system capable of extending endurance time, comprising: a main aircraft including a first body, a second body, a first wing portion, a second wing portion, a third wing portion, a first propeller disposed at a front end of the first body, a second propeller disposed at a front end of the second body, wherein, the second wing portion is located between the first body and the second body, and the second wing portion connects the first body and the second body; an auxiliary aircraft including a third body, a third propeller, and an auxiliary wing portion, wherein, the auxiliary aircraft is disposed below the second wing portion; and a connection device including a fixing portion and a connection rod, wherein, an upper portion of the fixing portion is fixed and connected to the second wing portion, and a lower portion of the fixing portion has a separation device such that the lower portion of the fixing portion is detachably connected with a first end of the connection rod, and a second end of the connection rod is fixed and connected to the auxiliary aircraft.

Wherein, when the high-flying solar unmanned aircraft system takes off, the first propeller, the second propeller and the third propeller are rotated simultaneously; when the high-flying solar unmanned aircraft system reach a preset altitude, the separation device is turned on such that the connection rod and the auxiliary aircraft are separated from the main aircraft.

Wherein, the second wing portion includes a horizontal beam, the upper portion of the fixing portion has a bridging plate and two holding holes, and the two holding holes are disposed at two terminals of the bridging plate.

Wherein, the lower portion of the fixing portion further includes a fixing seat, the fixing seat is provided with an inner surface, the separation device is disposed at the inner surface in order to be detachably connected with the first end of the connection rod.

Wherein, the separation device includes a fixing ring and a heating wire, and the heating wire is contacted with the fixing ring.

Wherein, the fixing ring is made of plastic or rubber, and a thickness of a portion of the fixing ring that is contacted with the heating wire is thinner.

Wherein, an upper side of each of the first wing portion, the second wing portion and the third wing portion is provided with a solar panel.

Wherein, the third propeller is disposed opposite to the first propeller and the second propeller, and disposed at a rear end of the third body, and a rear end of the first body and a rear end of the second body are connected through a tail wing portion.

Wherein, the main aircraft further comprises a main control system, the main aircraft further comprises a main control system, a main charge and discharge controller and a main battery; the auxiliary aircraft further comprises an auxiliary control system, an auxiliary charge and discharge controller and an auxiliary battery, wherein, the auxiliary battery is electrically connected to the main charge and discharge controller.

In order to solve the above technology problem, another technology solution adopted by the present invention is: a high-flying solar unmanned aircraft system capable of extending endurance time, comprising: a main aircraft including a first body, a second body, a first wing portion, a second wing portion, a third wing portion, a first propeller disposed at a front end of the first body, a second propeller disposed at a front end of the second body and a main battery, wherein, the second wing portion is located between the first body and the second body, and the second wing portion connects the first body and the second body; an auxiliary battery disposed below the first wing portion, the second wing portion or the third wing portion, and electrically connected to the main battery; and a connection device including a fixing cable and a heating wire, wherein, the fixing cable fixes the auxiliary battery to the main aircraft and the heating wire is connected with the fixing cable.

Wherein, the auxiliary battery is disposed below the second wing portion, and the auxiliary battery includes a parachute.

DETAILED DESCRIPTION OF THE PREFERRED EMBODIMENT

Figure 1:
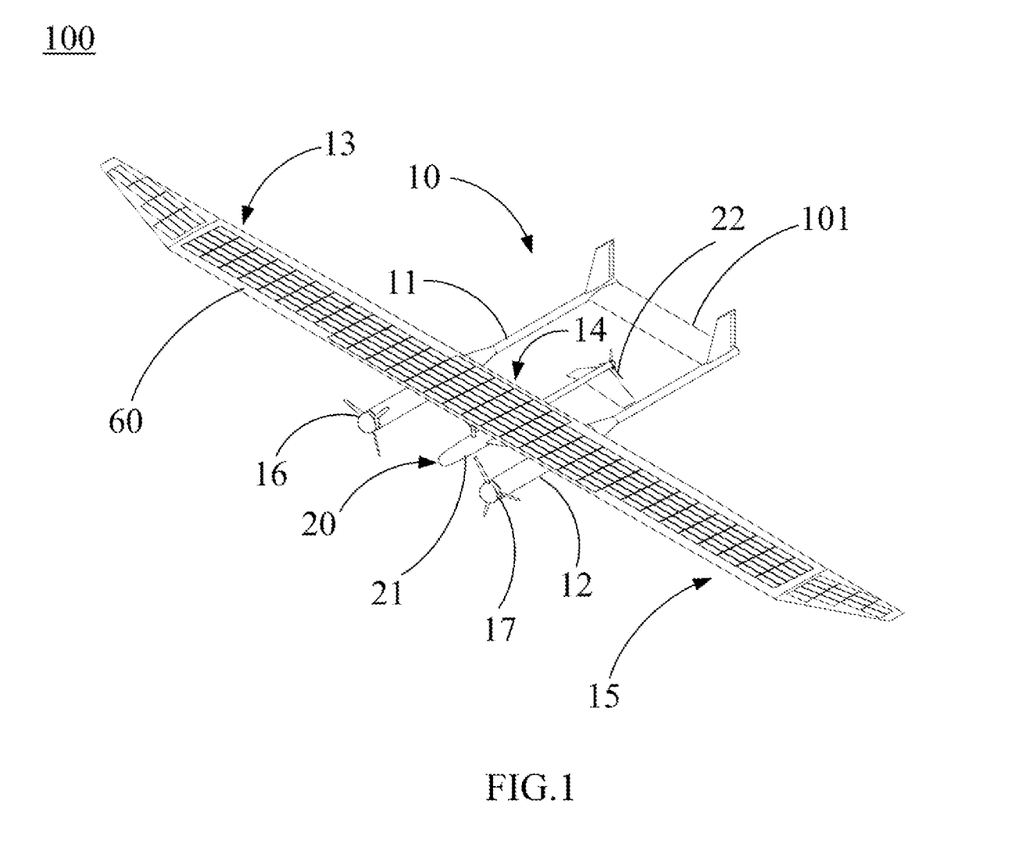
FIG. 1 is a schematic diagram of a high-flying solar unmanned aircraft system capable of extending endurance time according to a first embodiment of the present invention.
Figure 2:
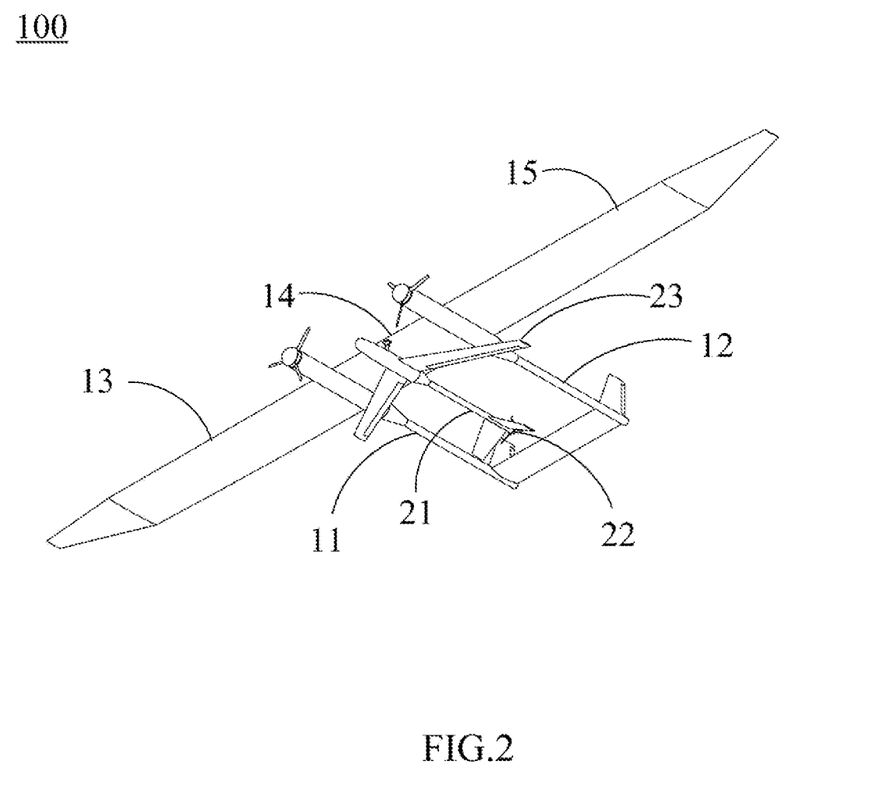
FIG. 2 is a schematic diagram of a high-flying solar unmanned aircraft system capable of extending endurance time at another viewing angle according to a first embodiment of the present invention.
Figure 3:
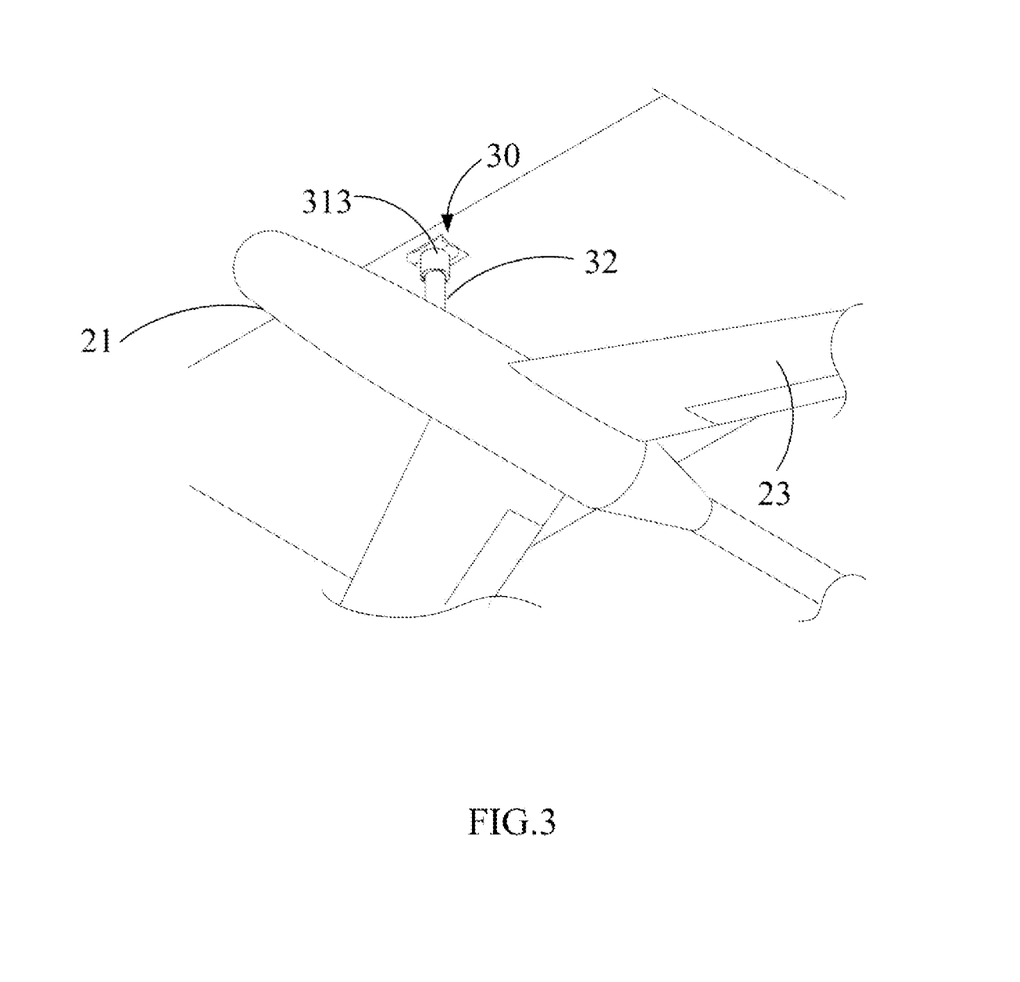
FIG. 3 is a schematic diagram of a connection device that connects a main aircraft with an auxiliary power source according to a first embodiment of the present invention.

With reference to FIG. 1, FIG. 2 and FIG. 3, the figures show a first embodiment of the present invention. Wherein, FIG. 1 is a schematic diagram of a high-flying solar unmanned aircraft system capable of extending endurance time according to the present invention; FIG. 2 is a schematic diagram of a high-flying solar unmanned aircraft system capable of extending endurance time viewed at another viewing angle according to the present invention; FIG. 3 is a schematic diagram of a connection device that connects a main aircraft with an auxiliary power source according to the present invention. In the present embodiment, the auxiliary power source is an auxiliary aircraft 20. Accordingly, the high-flying solar unmanned aircraft system capable of extending endurance time 100 of the present invention includes a main aircraft, an auxiliary aircraft 20 and a connection device 30. The connection device 30 connects the main aircraft 10 and the auxiliary aircraft 20 when the high-flying solar unmanned aircraft system 100 is taking off and climbing. The auxiliary aircraft 20 includes an auxiliary battery 25 (shown in FIG. 7) and/or a fuel tank (not shown). Before, the high-flying solar unmanned aircraft system 100 takes off, the auxiliary battery 25 is fully charged or the fuel tank is filled with fuel. Accordingly, when the high-flying solar unmanned aircraft system 100 takes off and climbs, the auxiliary aircraft 20 can generates a trust required by the high-flying solar unmanned aircraft system 100 in order to assist the high-flying solar unmanned aircraft system 100 to take off and climb. When the high-flying solar unmanned aircraft system 100 reaches a preset altitude, the auxiliary aircraft 20 will be separated from the main aircraft 10 so that the weight of the high-flying solar unmanned aircraft system 100 is reduced. Accordingly, the main aircraft 10 can perform a long time cruise in order to extend the endurance time.

The main aircraft 10 has a first body 11, a second body 12, a first wing portion 13, a second wing portion 14, a third wing portion 15, a first propeller 16, a second propeller 17, a main control system 18, a main battery 19 and a tail wing portion 101. Wherein, the first wing portion 13 is adjacent to the first body 11, the third wing portion 15 is adjacent to the second body 12, the second wing portion 14 is located between the first body 11 and the second body 12, and the second wing portion 14 connects the first body 11 and the second body 12. Besides, the second wing portion 12 includes a horizontal beam 141 (shown in FIG. 4). Each of the first wing portion 13, the second wing portion 14 and the third wing portion 15 is provided with a solar panel 60. The first propeller 16 is disposed at a front end of the first body 11, the second propeller 17 is disposed at a front end of the second body 12. That is, the first propeller 16 and the second propeller 17 are both disposed at a same terminal of the high-flying solar unmanned aircraft system 100. A rear end of the first body 11 and a rear end of the second body 12 are connected with each other through the tail wing portion 101. With also reference to FIG. 7, when the main aircraft 10 takes off or cruises, the main control system 18 controls the main battery 19 to discharge in order to drive the first propeller 16 and the second propeller 17 in order to generate a trust so as to generate a lift force of the main aircraft 10 through the first wing portion 13, the second wing portion 14 and the third wing portion 15.

The auxiliary aircraft 20 is disposed below the second wing portion 14. That is, the auxiliary aircraft 20 is disposed at a side of the second wing portion 14 away from the solar panel 60. The auxiliary aircraft 20 has a third body 21, a third propeller 22, an auxiliary wing portion 23, an auxiliary control system 24 and an auxiliary battery 25. Wherein, the third propeller 22 is disposed at a rear end of the third body 21. That is, the third propeller 22 is disposed oppositely to the first propeller 16 and the second propeller 17 so that the third propeller 22 is located at a rear terminal of the high-flying solar unmanned aircraft system 100. When the high-flying solar unmanned aircraft system 100 takes off or climbs, the auxiliary control system 24 controls the auxiliary battery 25 to discharge in order to drive the third propeller 22 to generate a trust, and a lift force is generated through the auxiliary wing portion 23. Accordingly, the auxiliary aircraft 20 can assist the main aircraft 10 to take off and climb without causing a burden to the main aircraft 10. It should be understood that the third propeller 22 can also be disposed at a front end of the third body 21, specifically when the auxiliary aircraft 20 carries a fuel tank and using fuel as a power source.

Figure 4:
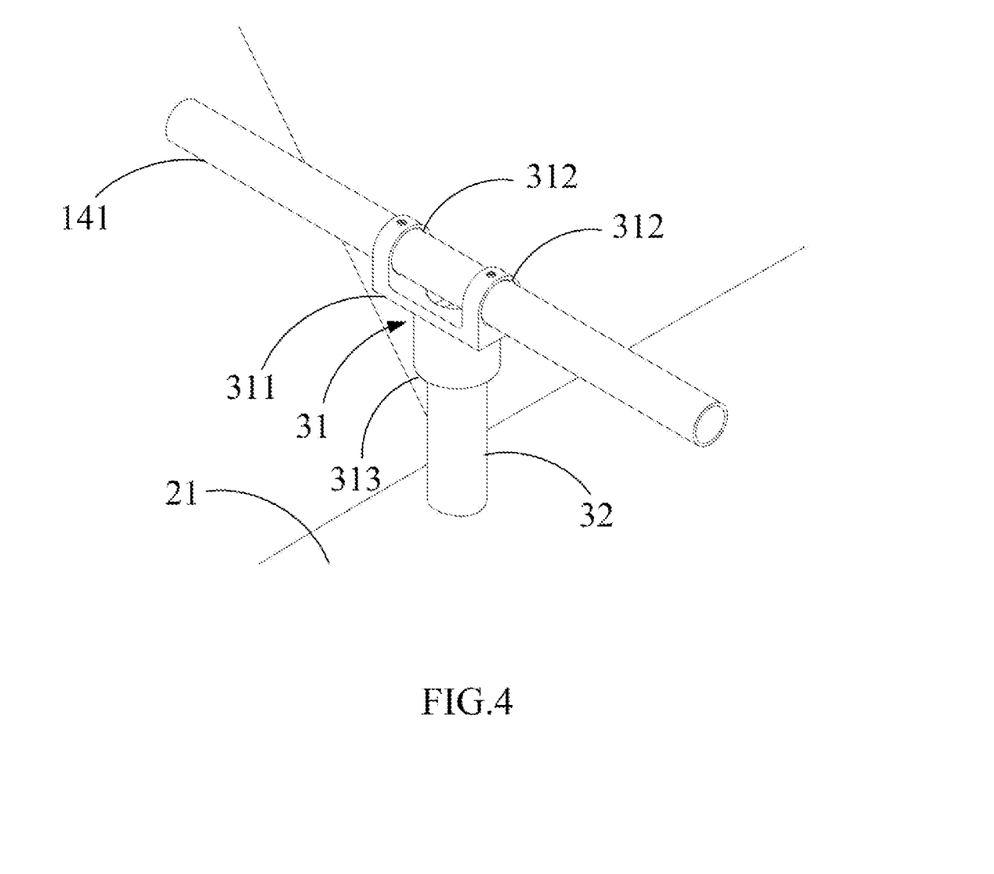
FIG. 4 is a schematic diagram of a connection device according to a first embodiment of the present invention.
Figure 5:
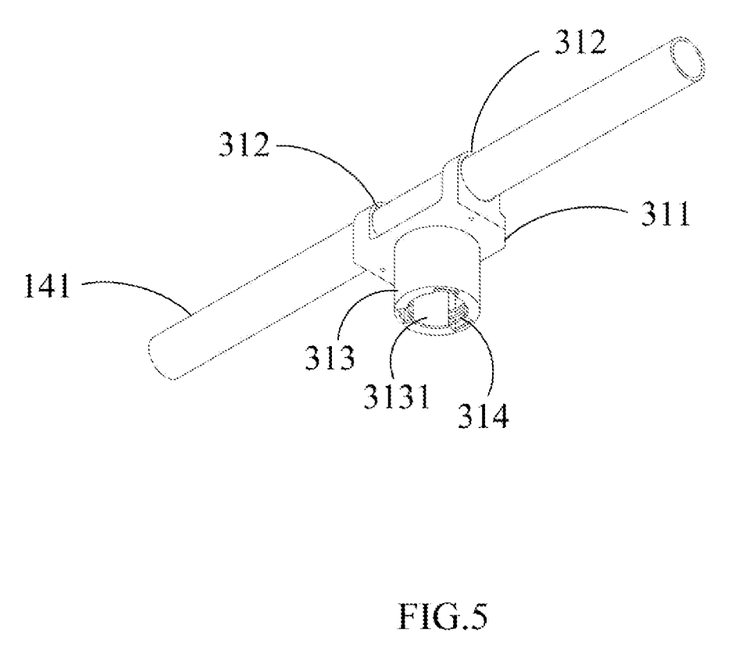
FIG. 5 is a schematic diagram of a connection device at another viewing angle according to a first embodiment of the present invention.
Figure 6:
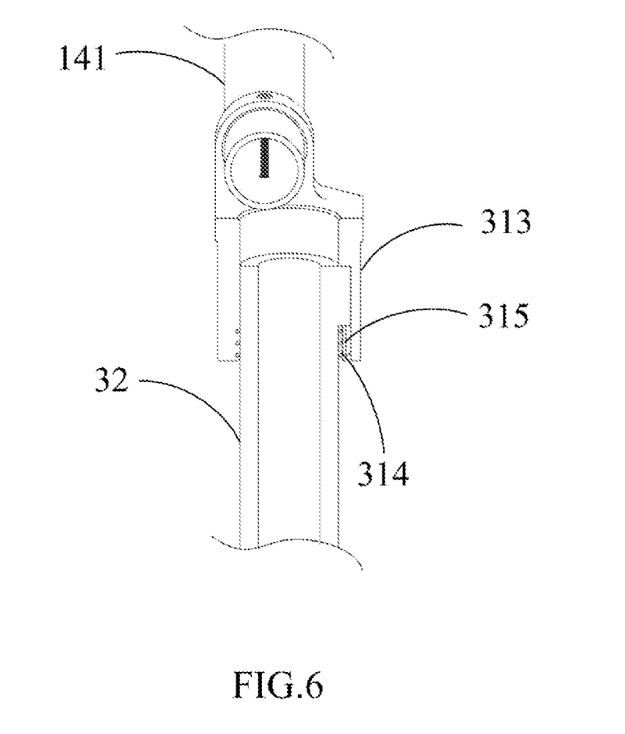
FIG. 6 is a schematic diagram of a connection device at another viewing angle according to a first embodiment of the present invention.

As shown FIG. 4, FIG. 5 and FIG. 6, the connection device 30 includes a fixing portion 31 and a connection rod 32. An upper portion of the fixing portion 31 is fixed and connected to the horizontal beam 41 of the second wing portion 14, and a lower portion of the fixing portion 31 is detachably connected with the connection rod 32. Specifically, the upper portion of the fixing portion 31 has a bridging plate 311 and two holding holes 312. Wherein, the two holding holes 312 are disposed at two terminals of the bridging plate 311, and lower ends of the two holding holes 312 are connected with a top surface of the bridging plate 311 such that the connection device 30 is fixed to the horizontal beam 141. A lower portion of the fixing portion 31 is provided with a fixing seat 313 and a separation device. In the present embodiment, the separation device includes a fixing ring 314 and a heating wire 315. Wherein, the fixing ring 314 and the heating wire 315 are disposed at an inner surface 3131 of the fixing seat 313. The fixing ring 314 is made of plastic or rubber, and the heating wire 315 is contacted with a weak portion of the fixing ring 314 such as a thinner portion of the fixing ring 314. One terminal of the connection rod 32 is fixed in the inner surface 3131 of the fixing seat 313 through the fixing ring 313, and the other end of the connection rod 32 is fixed to the auxiliary aircraft 20.

Figure 7:
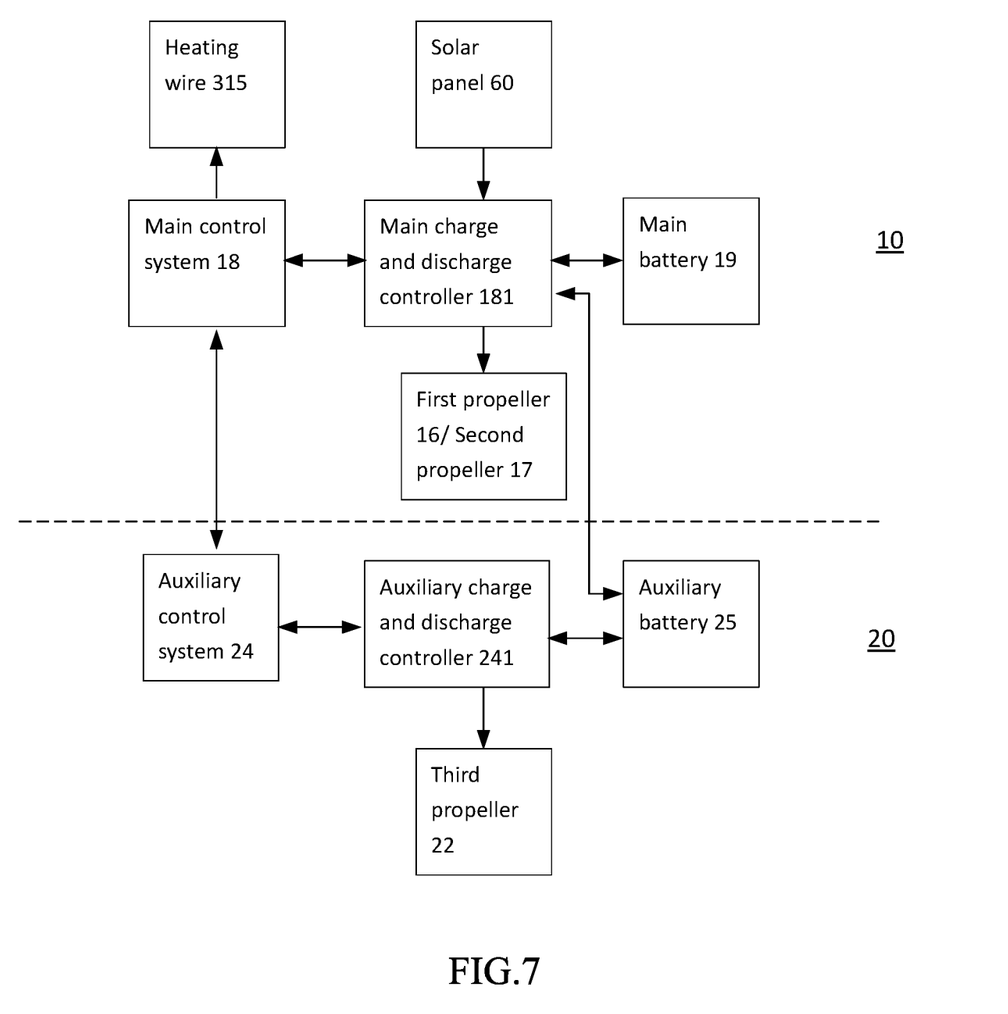
FIG. 7 is a system circuit diagram of the present invention.

With further reference to FIG. 7, and FIG. 7 is a circuit diagram of the high-flying solar unmanned aircraft system 100 according to the present invention. As described above, when the high-flying solar unmanned aircraft system 100 takes off or climb, the main control system 18 of the main aircraft 10 controls the main battery 19 to discharge through a main charge and discharge controller 181, and drives the first propeller 16 and second propeller 17 to rotate in order to generate a trust so that a left force is generated through the first wing portion 13, the second wing portion 14 and the third wing portion 15. Besides, the main control system 18 informs the auxiliary control system 24 of the auxiliary aircraft 20 or auxiliary control system 24 is controlled by a ground station. Accordingly, the auxiliary control system 24 controls the auxiliary battery 25 to provide energy to the third propeller 22 through an auxiliary charge and discharge controller 241 such that the third propeller 22 is rotated to generate a trust. Therefore, a left force is generated through the auxiliary wing portion 23 in order to increase a left force when the main aircraft 10 takes off and climbs up.

When the high-flying solar unmanned aircraft system 100 reaches a preset altitude, the high-flying solar unmanned aircraft system 100 can climb stably and a large trust is not required. Accordingly, the main control system 18 of the main aircraft 10 controls the heating wire 315 to generate heat, or a ground station controls the heating wire 315 to generate heat. Because the heating wire 315 is contacted with the fixing ring 314, after a preset time, the fixing ring 314 is burned out such that the connection rod 32 will be separated from the fixing seat 313. The connection rod 32 and the auxiliary aircraft 20 will be separated from the main aircraft 10 together. Accordingly, the weight of the high-flying solar unmanned aircraft system 100 will be greatly reduced. After the auxiliary aircraft 20 is separated from the main aircraft 10, the main aircraft 10 can fly with a lighter weight and using the main battery 19 to store energy and using the solar panel 60 to charge the main battery 19. Accordingly, the main aircraft 10 can fly at a high altitude of 15 km to 20 km to perform a preset cruise task. Besides, the auxiliary aircraft 20 can glide back to a base station by itself in order to reach a reusable purpose. At the same time, when the auxiliary aircraft 20 has not been separated yet, the auxiliary battery 25 of the auxiliary aircraft 20 can supply power to the main aircraft 10. The person skilled in the art can understand that the separation device of the present invention is not limited to the fixing ring 314 and the heating wire 315 as described above. The separation device can be other device such as a retractable actuator (not shown). When the retractable actuator is protruding to the inner surface 3131, the connection rod 32 is fixed to the fixing seat 313. When the retractable actuator is retracted back, the connection rod 32 can be separated from the fixing seat 313.

Figure 8:
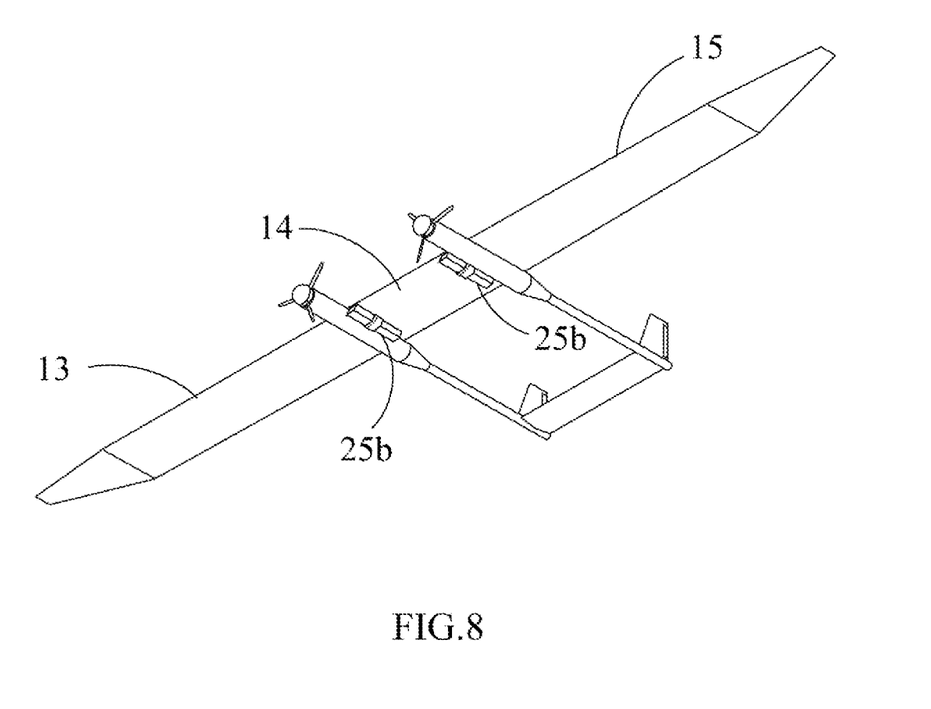
FIG. 8 is a schematic diagram of a high-flying solar unmanned aircraft system capable of extending endurance time according to a second embodiment of the present invention.
Figure 9:
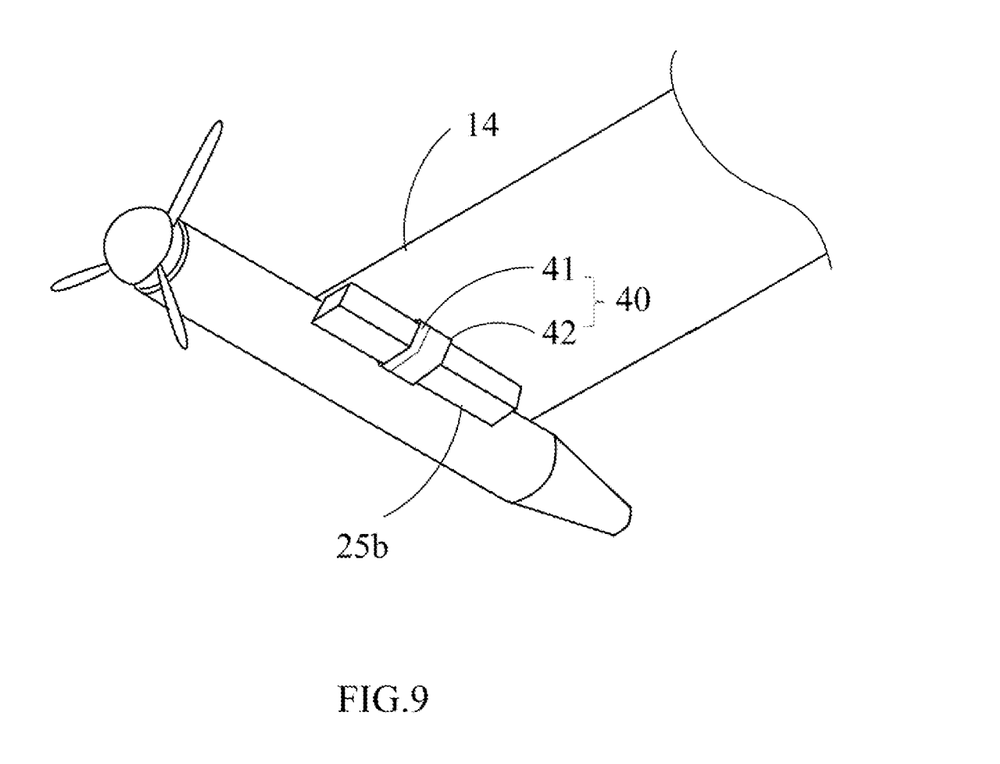
FIG. 9 is a schematic diagram of a connection device according to a second embodiment of the present invention.
Figure 10:
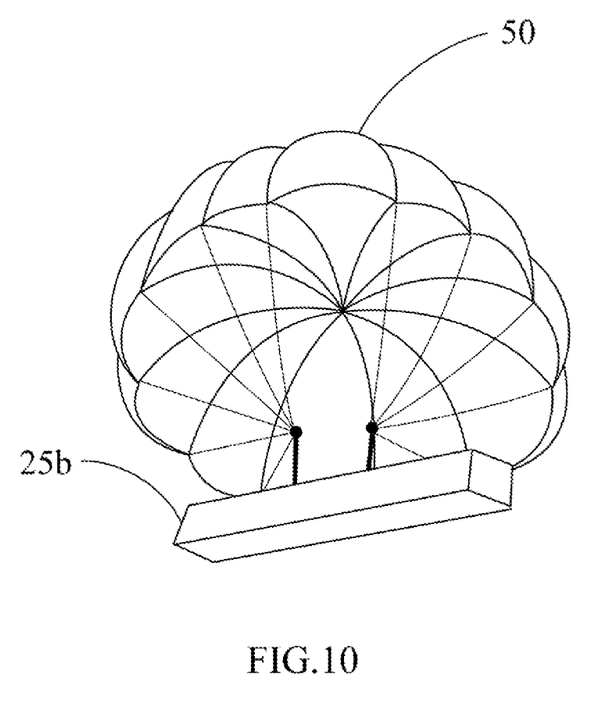
FIG. 10 is a schematic diagram of an auxiliary battery according to a second embodiment of the present invention.

With reference to FIG. 8, FIG. 9 and FIG. 10, which are schematic diagrams of the high-flying solar unmanned aircraft system according to a second embodiment of the present invention. In the present embodiment, the auxiliary power source of the high-flying solar unmanned aircraft system capable of extending endurance time 100b is an auxiliary battery 25b fixed below the second wing portion 14. It can be understood that the auxiliary battery 25b can also be fixed below the first wing portion 13 or the third wing portion 15 based on an actual requirement. Besides, the auxiliary battery 25b also has a parachute 50 (as shown in FIG. 10). A connection device 40 includes a fixing cable 42 and a heating wire 41. Before taking off, the auxiliary battery 25b is fully charged, and electrically connected to the main battery 19. When taking off and climbing, the auxiliary battery 25b can assist the main battery 19 to generate a large trust required by the climbing. When the high-flying solar unmanned aircraft system capable of extending endurance time 100b reach a preset altitude, the main control system 18 of the main aircraft 10 control the heating wire 41 to generate heat or a ground station control the heating wire 41 to generate heat. Because the heating wire 41 is contacted with the fixing cable 42, after a preset time, the fixing cable 42 is burned out. At this time, the auxiliary battery 25b is separated from the main aircraft 10 such that the main aircraft 10 can continue to climb and cruise with a lighter weight. After the auxiliary battery 25b is separated from the main aircraft 10, the parachute 50 of the auxiliary battery 25b can be opened (as shown in FIG. 10) so that the auxiliary battery 25b can go down with a safer speed.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A high-flying solar unmanned aircraft system capable of extending endurance time, comprising:
    a main aircraft including a first body, a second body, a first wing portion, a second wing portion, a third wing portion, a first propeller disposed at a front end of the first body, a second propeller disposed at a front end of the second body, wherein, the second wing portion is located between the first body and the second body, and the second wing portion connects the first body and the second body;
    an auxiliary aircraft including a third body, a third propeller, and an auxiliary wing portion, wherein, the auxiliary aircraft is disposed below the second wing portion; and
    a connection device including a fixing portion and a connection rod, wherein, an upper portion of the fixing portion is fixed and connected to the second wing portion, and a lower portion of the fixing portion has a separation device such that the lower portion of the fixing portion is detachably connected with a first end of the connection rod, and a second end of the connection rod is fixed and connected to the auxiliary aircraft.

2. The high-flying solar unmanned aircraft system according to claim 1, wherein, when the high-flying solar unmanned aircraft system takes off, the first propeller, the second propeller and the third propeller are rotated simultaneously; when the high-flying solar unmanned aircraft system reach a preset altitude, the separation device is turned on such that the connection rod and the auxiliary aircraft are separated from the main aircraft.

3. The high-flying solar unmanned aircraft system according to claim 2, wherein, the second wing portion includes a horizontal beam, the upper portion of the fixing portion has a bridging plate and two holding holes, and the two holding holes are disposed at two terminals of the bridging plate.

4. The high-flying solar unmanned aircraft system according to claim 3, wherein, the lower portion of the fixing portion further includes a fixing seat, the fixing seat is provided with an inner surface, the separation device is disposed at the inner surface in order to be detachably connected with the first end of the connection rod.

5. The high-flying solar unmanned aircraft system according to claim 3, wherein, the separation device includes a fixing ring and a heating wire, and the heating wire is contacted with the fixing ring.

6. The high-flying solar unmanned aircraft system according to claim 3, wherein, the fixing ring is made of plastic or rubber, and a thickness of a portion of the fixing ring that is contacted with the heating wire is thinner.

7. The high-flying solar unmanned aircraft system according to claim 2, wherein, an upper side of each of the first wing portion, the second wing portion and the third wing portion is provided with a solar panel.

8. The high-flying solar unmanned aircraft system according to claim 7, wherein, the third propeller is disposed opposite to the first propeller and the second propeller, and disposed at a rear end of the third body, and a rear end of the first body and a rear end of the second body are connected through a tail wing portion.

9. The high-flying solar unmanned aircraft system according to claim 7, wherein, the third propeller is disposed at a front end of the third body, and the auxiliary aircraft carries a fuel tank and using fuel as a power source.

10. The high-flying solar unmanned aircraft system according to claim 7, wherein, the auxiliary aircraft includes an auxiliary battery.

11. The high-flying solar unmanned aircraft system according to claim 1, wherein, the main aircraft further comprises a main control system, a main charge and discharge controller and a main battery; the auxiliary aircraft further comprises an auxiliary control system, an auxiliary charge and discharge controller and an auxiliary battery, wherein, the auxiliary battery is electrically connected to the main charge and discharge controller.

12. A high-flying solar unmanned aircraft system capable of extending endurance time, comprising:

a main aircraft including a first body, a second body, a first wing portion, a second wing portion, a third wing portion, a first propeller disposed at a front end of the first body, a second propeller disposed at a front end of the second body and a main battery, wherein, the second wing portion is located between the first body and the second body, and the second wing portion connects the first body and the second body;

an auxiliary battery disposed below the first wing portion, the second wing portion or the third wing portion, and electrically connected to the main battery; and a connection device including a fixing cable and a heating wire, wherein, the fixing cable fixes the auxiliary battery to the main aircraft and the heating wire is connected with the fixing cable.

13. The high-flying solar unmanned aircraft system capable of extending endurance time according to claim 12, wherein, the auxiliary battery is disposed below the second wing portion, and the auxiliary battery includes a parachute; when the high-flying solar unmanned aircraft system reaches a preset altitude, the auxiliary battery is separated from the main aircraft through breaking the fixing cable.

\* \* \* \* \*